United States Patent
Richardson et al.

(10) Patent No.: US 6,521,088 B1
(45) Date of Patent: Feb. 18, 2003

(54) DEGRADED HYDROPHOBIC, PARTICULATE STARCHES AND THEIR USE IN PAPER SIZING

(75) Inventors: Paul H. Richardson, Plainsboro, NJ (US); Ralph M. Trksak, Manville, NJ (US); John J. Tsai, Belle Mead, NJ (US); Eric M. Weisser, Somerset, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/698,456

(22) Filed: Oct. 27, 2000

Related U.S. Application Data

(63) Continuation-in-part of application No. 09/447,493, filed on Nov. 23, 1999, now abandoned.

(51) Int. Cl.[7] ............................................. D21H 19/12
(52) U.S. Cl. ...................... 162/175; 162/175; 162/177; 162/178; 106/207.1; 106/215.1; 427/395
(58) Field of Search ............................... 162/175, 177, 162/178.1, 168.1, 135; 106/207.1, 215.1; 427/395

(56) References Cited

U.S. PATENT DOCUMENTS

| | | |
|---|---|---|
| 2,661,349 A | 12/1953 | Caldwell et al. ............ 260/224 |
| 2,876,117 A | 3/1959 | Jackson et al. ............... 106/15 |
| 2,929,811 A | 3/1960 | Hofreiter et al. ........ 260/233.3 |
| 3,387,998 A | 6/1968 | Powers |
| 3,746,690 A | 7/1973 | Lolkema et al. ........... 260/77.5 |
| 3,919,042 A | 11/1975 | Spiller ........................ 162/175 |
| RE28,809 E | 5/1976 | Tessler .................... 260/233.5 |
| 4,239,592 A | 12/1980 | Gaspar et al. .............. 162/175 |
| 4,499,116 A | 2/1985 | Zwiercan et al. ........... 426/582 |
| 4,687,519 A | 8/1987 | Trzasko et al. ............. 106/211 |
| 4,721,655 A | 1/1988 | Trzasko et al. ............. 428/530 |
| 4,838,944 A | 6/1989 | Kruger ........................ 127/71 |
| 5,362,573 A | 11/1994 | Pandian et al. ............. 428/511 |
| 5,523,339 A | 6/1996 | Solarek et al. ................ 524/47 |
| 5,647,898 A | 7/1997 | Fuertes et al. ........... 106/162.1 |
| 5,672,699 A | 9/1997 | Billmers et al. ............ 536/102 |
| 5,718,770 A | 2/1998 | Shah et al. ................... 127/65 |
| 5,833,755 A | 11/1998 | Schlom et al. ................ 127/32 |

FOREIGN PATENT DOCUMENTS

| | | | |
|---|---|---|---|
| CA | 1 143 914 | 4/1983 | ............ D21H/1/40 |
| JP | 53-35639 | 9/1978 | .......... D06M/15/04 |
| WO | WO 99/12977 | 3/1999 | ........... C08B/31/04 |

OTHER PUBLICATIONS

Dengate, H.N., Baruch, D.W., Meredith, P.; "The Density of Wheat Starch Granules: A Tracer Dilution Procedure for Determining the Density of an Immiscible Dispersed Phase"; Starch 30 (1978) Nr.3, 80–84.

Evans, I.D., Haisman, D.R.; "Rheology of Gelatinized Starch Suspensions"; Journal of Texture Studies 10 (1979) 347–370.

*Primary Examiner*—Peter Chin
(74) *Attorney, Agent, or Firm*—Ellen T. Dec, Esq.

(57) ABSTRACT

This invention is directed to degraded, hydrated particulate starches that are hydrophobically modified and a method of providing paper with reduced porosity, resistance to liquid penetration and increased surface strength comprising applying to the surface of a paper substrate an effective amount of a surface sizing composition which comprises such starch. In particular, the starches are those in which the starch base is degraded to a water fluidity (WF) of from about 10 to 80 or the modified and/or particulate starch is degraded using a substantially equivalent amount of degradation agent and substantially the same reaction conditions, the starch is modified with a hydrophobic hydrocarbon group of 5 to 23 carbon atoms at about 1 to 20% substitution level by weight of bound hydrophobe based on the weight of starch, and the hydrated starch has a volume average hydrated particle size of at least about 20 microns and a volume fraction of hydrated particles at 1% solids of at least about 5%.

13 Claims, No Drawings

DEGRADED HYDROPHOBIC, PARTICULATE STARCHES AND THEIR USE IN PAPER SIZING

This application is a continuation-in-part of application Ser. No. 09/447,493 filed Nov. 23, 1999 now abandoned.

BACKGROUND OF THE INVENTION

This invention relates to degraded, particulate starches that are hydrophobically modified and especially effective in reducing the porosity of paper, improving the resistance to penetration by liquids and improving the surface strength when applied as a paper surface size. Blends of a degraded, particulate starch and a film former are also effective as a paper surface size to provide these properties.

The use of surface sizing in paper is known to provide several beneficial attributes to the paper and processing thereof including paper strength, retarding liquid penetration into the sheet and the quality and ease of printing on the paper. Starches are one of the most used raw materials in the paper industry and are often added in the wet end of the papermaking machine or as a surface size or coating.

Various paper grades require a low level of porosity to air in order to feed properly in copiers and sorting machines for example. Other paper grades require a highly continuous film on their surface that will resist penetration by non-aqueous fluids.

Surprisingly, it has been found that use as a paper surface size of a degraded, particulate starch which is hydrophobically modified, is especially effective in reducing paper porosity, resisting the penetration of liquids and improving surface strength as well as being cost effective.

SUMMARY OF THE INVENTION

Now, in accordance with this invention, it has been found that selected degraded, particulate starches that are hydrophobically modified are particularly useful as paper surface sizes to provide improved properties, particularly reduced porosity of paper, resistance to liquid penetration and increased surface strength.

More particularly, this invention relates to a method of providing paper with improved surface sizing properties comprising applying to the surface of a paper substrate an effective amount of a surface sizing composition which comprises a degraded, particulate, hydrophobic starch wherein the starch is modified with a hydrophobic hydrocarbon group of 5 to 23 carbon atoms at about 1 to 20% substitution level by weight of bound hydrophobe based on the weight of dry starch, the volume average size of the hydrated starch particles is at least about 20 microns and the volume fraction of the hydrated starch particles at 1% weight concentration in water is at least about 5%. Typically, the starch base is degraded to a water fluidity (WF) of from about 10 to 80 or the hydrophobically modified and/or particulate starch is degraded using an equivalent amount of degradation agent and substantially the same reaction conditions.

It has also been found that blends of a degraded, particulate starch and a film forming material are effective at improving surface sizing properties such as porosity reduction, resistance to liquid penetration and surface strength when used as a surface size on paper. More particularly, the level of degradation, the volume average size and the volume fraction of hydrated starch particles at 1% solids that are useful for the degraded, particulate starch are the same as that described above for the hydrophobically modified, degraded, particulate starch. A film former (film forming material) is intended to mean a polymer which helps to provide improved surface sizing properties such as porosity reduction, resistance to liquid penetration and surface strength, when added to the degraded particulate starch. The film former may be a hydrophobically modified starch, wherein the starch is modified with a hydrophobic hydrocarbon group of 5 to 23 carbon atoms at about 1 to 20% substitution level by weight of bound hydrophobe based on the weight of dry starch. Other illustrative film formers that may be used are modified starch, alginate, pectin, carboxymethylcellulose, polyvinyl alcohol, xanthan gum, rhamsan gum and welan gum. Typical modified starches include hydroxyalkylated starch with the alkyl group possessing 1 to 4 carbon atoms, oxidized, enzyme converted, thermally converted, acetylated and cationized starches. The degraded, particulate starch:film former blends may be used in amounts of from about 1:99 to 99:1 parts by weight of starch per part by weight of film former.

DETAILED DESCRIPTION OF THE INVENTION

The selected starches provided by this invention and useful in surface sizing paper are degraded, hydrophobically modified particulate starches. The terms "surface sizing", "surface application" and "paper coating" as used herein refer to the use or application of the starch composition of this invention on paper to provide properties including reduced porosity, resistance to penetration by liquids (e.g. water and aqueous solutions, inks, oils, solvents, greases, and silicone fluids) and improved surface strength.

All starches and flours (hereinafter "starch") may be suitable for use as a base material herein and may be derived from any native source. A native starch as used herein, is one as it is found in nature. Also suitable are starches derived from a plant obtained by breeding techniques including crossbreeding, translocation, inversion, transformation or any other method of gene or chromosome engineering to include variations thereof. In addition, starch derived from a plant grown from artificial mutations and variations of the above generic composition which may be produced by known standard methods of mutation breeding are also suitable herein.

Typical sources for the starch are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch containing at least about 95% by weight amylopectin and the term "high amylose" is intended to include a starch containing at least about 40% by weight amylose. Also included are derivatized or modified starches such as cationic and anionic starches.

The starches of this invention generally are converted or degraded starches, particularly those in which the base or native, unmodified and non-particulate starch has a water fluidity (WF) of from about 10 to 80, particularly about 30 to 70, or the modified and/or particulate starch is degraded using an equivalent amount of degradation agent and substantially the same reaction conditions. The measurement for water fluidity as described herein is made using a Thomas Rotational Shear type Viscometer in accordance with standard procedures such as disclosed in Zwiercan, et al., U.S. Pat. No. 4,499,116 issued Feb. 12, 1985, which patent is incorporated by reference herein. The starch may be converted or degraded to the selected water fluidity using known procedures such as oxidative hydrolysis, acid hydrolysis or enzyme hydrolysis. A particularly useful method of converting starch involves the use of hydrogen peroxide with a manganese catalyst such as potassium permanganate as disclosed in U.S. Pat. No. 4,838,944 issued Jun. 13, 1989 to L. Kruger. Another useful starch conversion process involves the use of a metal-based coordination complex catalyst, such as a manganese complex, as disclosed in U.S. Pat. No. 5,833,755 issued Nov. 10, 1998 to P. Schlom, et al. The starch conversion processes as disclosed in both the '944 and '755 patents are incorporated herein by reference.

Degradation of the starch can be performed before or after treatment that will create a particulate starch upon hydration (i.e. by cooking) and/or hydrophobic substitution. The degree of degradation or hydrolytic treatment of the modified and/or particulate starch is the same as used to achieve a 10 to 80 WF for a native, unmodified and non-particulate starch base.

The starches of this invention are formed into particulate starches. By particulate starch it is meant that the starch, after hydration, retains some granular structure such that there remains discrete particles. The starches of this invention have a volume average size of hydrated particles of at least about 20 microns, particularly from about 20 to 300 microns, more particularly from about 30 to 200 microns, most particularly from about 40 to 150 microns. Additionally, the number of particles in the particulate starch, represented by the volume fraction of hydrated starch particles at 1% solids, is at least about 5%, particularly at least about 10%, more particularly at least about 20%, and most particularly at least about 30%. Particulate starches can be prepared by a number of techniques known in the art including chemical crosslinking, physical modification, physical association (i.e., crystallization) and/or hydration under controlled conditions. Chemical crosslinking is a particularly suitable way to form particulate starches and this may include treatment with any of a number of multifunctional crosslinking agents known in the art and disclosed for example in "Starch Derivatives: Production and Uses" by M. Rutenberg and D. Solarek, *Starch: Chemistry and Technology*, Chapter X, pp. 324–332, 1984. Such crosslinking agents include bifunctional etherifying and/or esterifying agents such as epichlorohydrin, bis-β-chloroethyl ether, dibasic organic acids, phosphorus oxychloride, trimetaphosphate (i.e., the alkali and alkaline earth metal salts), and linear mixed anhydrides of acetic and di- or tribasic carboxylic acids. Another useful crosslinking agent is sodium hypochlorite, which when used in the proper amount and under pH conditions of at least 11 provides crosslinked starch as disclosed in Solarek et al., U.S. Pat. No. 5,523,339 issued Jun. 4, 1996, which patent is incorporated by reference herein. Particularly suitable crosslinking agents are epichlorohydrin, phosphorus oxychloride, adipic-acetic anhydrides and sodium trimetaphosphate, most particularly epichlorohydrin.

One technique for physically modifying the starch to form the particulate starch is the thermal inhibition of granular starch by heat treatment as disclosed in U.S. Pat. No. 5,718,770 issued to M. Shah, et al. on Feb. 17, 1998.

An important characteristic of the starches of this invention is the volume average size and volume fraction of the hydrated starch particles, both of which are influenced by the conditions used in preparing the particulate starch, e.g., cook conditions or the degree of crosslinking. This is important in providing the starch with suitable properties, particularly when it is being used in surface sizing paper to reduce porosity, provide resistance to liquid penetration and improve surface strength. The level of chemical crosslinking that is useful in providing the starches of this invention with desired volume average particle size and volume fraction at 1% solids after hydrating will range from about 0.05 to 5.0 crosslinks/1000 anhydroglucose units and more particularly from about 0.1 to 1.5 crosslinks/1000 anhydroglucose units.

In addition to being converted or degraded, the particulate starches of this invention are hydrophobically modified with hydrocarbon groups of at least 5 carbon atoms, more particularly from 5 to 23 and most particularly from 8 to 20 carbon atoms. In a particularly suitable embodiment, the hydrophobic hydrocarbon group will be an ester or ether substituent and may comprise saturated or unsaturated hydrocarbon groups and may contain some branching with unbranched hydrocarbon groups being particularly suitable. It should also be understood that the ester or ether substituents may contain other groups in addition to the hydrocarbon chains as long as such groups do not interfere with the net hydrophobic properties of the substituent.

The preparation of starch ester and ether derivatives is well known and has been carried out for many years. U.S. Pat. No, 2,661,349 issued on Dec. 1, 1953 to C. Caldwell, et al. describes hydrophobic starch derivatives such as starch alkyl or alkenyl succinates. This patent describes an aqueous method in which such derivatives are prepared using a standard esterification reaction wherein the reagent and starch suspended in water are mixed under alkaline conditions. Other methods for preparing the starch derivatives are known in the art and disclosed for example in the '349 patent as well as in "Modified Starches: Properties and Uses", edited by O. Wurzburg, 1986, Chapter 9, pp. 131–147 and U.S. Pat. No. 5,672,699 issued on Sep. 30, 1997 to R. Billmers, et al.

Reagents used in preparing the hydrophobic starch esters generally are organic acid anhydrides having one of the following formulas:

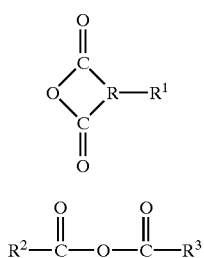

i)

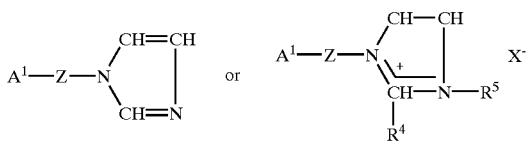

ii)

wherein R is a dimethylene or trimethylene group or the corresponding unsaturated group, e.g., ethenyl; $R^1$ is a linear, branched or cyclic alkyl, alkenyl, aralkyl or aralkenyl group having 3 to 21 carbon atoms; and $R^2$ and $R^3$ are independently a linear, branched or cyclic alkyl, alkenyl, aralkyl or aralkenyl group having 5 to 23 carbon atoms.

Another suitable class of reagents for preparing starch ester derivatives includes imidazolides or N,N'-disubstituted imidazolium salts of carboxylic or sulfonic acids such as those described in U.S. Pat. No. 4,721,655, issued Jan. 26, 1988 to P. Trzasko having the general formula:

wherein Z is —CO— or —SO$_2$—, $A^1$ comprises a hydrocarbon of at least 5, more particularly 5 to 23 carbon atoms, $R^4$ is H or $C_1$–$C_4$ alkyl, $R^5$ is $C_1$–$C_4$ alkyl and $X^-$ is an anion.

A class of reagents useful as etherifying reagents are described in U.S. Pat. No. 2,876,117 issued on Mar. 3, 1959 to E. Paschall and comprise the reaction product of epihalohydrin with a tertiary amine having the structure:

$$R^6-\underset{\underset{R^7}{|}}{N}-A^2$$

wherein $R^6$ and $R^7$ are independently H or a $C_1$–$C_4$ alkyl and $A^2$ comprises a hydrocarbon group of at least 5, more particularly 5 to 23 carbon atoms.

Another type of hydrophobic reagent which can be used to produce starch ethers has the following formula:

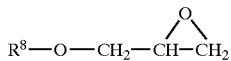

Another type of hydrophobic reagent which produces a starch ether is described below, wherein $R^9$ and $R^{10}$ are either a hydrogen or linear, branched or cyclic alkyl, alkenyl, aralkyl or aralkenyl groups having 3 to 21 carbon atoms.

The hydrophobic hydrocarbon and particularly the ester or ether derivatives of this invention as described herein will comprise from about 1 to 20% and particularly from about 3 to 12% by weight of bound derivative or substituent based on the weight of dry starch.

In some cases, a single agent may be used to crosslink and to hydrophobically modify the starch.

The hydrophobically modified starch esters or ethers of this invention are useful in surface sizing or coating paper to provide improved surface sizing properties including reduced paper porosity, resistance to liquid penetration and surface strength, particularly the esters. The starch surface sizing composition will be used for this purpose in amounts of from about 0.5 to 15% by weight, particularly from about 2 to 6% by weight, based on weight of the paper substrate.

The degraded, hydrophobically modified, particulate starches as described herein are useful as paper surface sizes to provide improved properties especially reduced porosity of paper, resistance to liquid penetration and surface strength. Particularly useful starches of this type are those having a volume average size, as described herein, of hydrated starch particles of at least about 20 microns, particularly from about 20 to 300 microns, more particularly from about 30 to 200 microns, most particularly from about 40 to 150 microns.

The starch surface sizing material can be applied to the paper using known methods of application which commonly involve application to the surface of a paper web by a size applicator such as a conventional twin roll size press, tub size press, calender water box, pre-metering size press or gate roll. With applicators other than the pre-metering size press and gate roll, dry paper is passed through a flooded nip and a solution or dispersion of the surface sizing material and other functional chemicals contact both sides of the paper. Excess liquid is squeezed out in the press and the paper is redried and cured. With the pre-metering size press and gate roll, the solution or dispersion of the sizing material and other functional chemicals are metered onto an applicator roll which then applies the solution or dispersion to the surface of the paper, which is then redried and cured.

The surface size composition of the present invention may be successfully utilized for the surface sizing of paper and paperboard prepared from all types of both cellulosic and non-cellulosic fibers, and combinations thereof. Also included are sheet-like masses and molded products prepared from combinations of cellulosic and non-cellulosic materials derived from synthetics such as polyamide, polyester and polyacrylic resin fibers as well as from mineral fibers such as asbestos and glass. The hardwood or softwood cellulosic fibers which may be used include bleached and unbleached sulfate (Kraft), bleached and unbleached sulfite, bleached and unbleached soda, neutral sulfite, semi-chemical, groundwood, chemi-groundwood, and any combination of these fibers. In addition, synthetic cellulosic fibers of the viscose rayon or regenerated cellulose type can also be used, as well as recycled waste papers from various sources.

All types of pigments and fillers may be added in the usual manner to the paper product which is to be surface sized. Such materials include without limitation clay, talc, titanium dioxide, calcium carbonate, calcium sulfate and diatomaceous earths. Stock additives, such as defoamers, pitch dispersants, slimicides, etc., as well as other sizing compounds, can also be used with the surface sizing mixtures described herein. Further, less expensive traditionally used starches may be blended in to obtain a more cost effective surface sizing starch.

In addition to the use of degraded, hydrophobically modified, particulate starch as described above as a surface sizing composition, blends of a degraded, particulate starch with a film forming material are also found to be effective in providing improved surface sizing properties such as porosity reduction, resistance to liquid penetration and surface strength when used as a surface size on paper. The level of degradation, the volume average size of hydrated starch particles and the volume fraction of hydrated starch particles at 1% solids that are useful on the starch are the same as that described previously for the hydrophobically modified, degraded, particulate starch. That is, the degradation level of the native, unmodified and non-particulate starch base is typically from about 10 to 80 WF, particularly from about 30 to 70 WF, or the modified and/or particulate starch is degraded using an equivalent amount of degradation agent and substantially the same reaction conditions. The volume average size of hydrated starch particles is generally at least about 20 microns, particularly from about 20 to 300 microns, more particularly from about 30 to 200 and most particularly from about 40 to 150 microns. Additionally, the number of particles in the particulate starch is represented by a volume fraction of hydrated starch particles at 1% solids of at least about 5%, particularly at least about 10%, more particularly at least about 20%, most particularly at least about 30%. Particulate starch can be formed as noted above, by chemical crosslinking, physical modification, physical association or hydrating under controlled conditions with chemical crosslinking being a particularly suitable method. The film former may be a hydrophobically modified starch, wherein the hydrophobe can be an ester or ether substituent comprising a saturated or unsaturated hydrocarbon chain of at least 5 and more particularly 5 to 23 carbon atoms and there is about 1 to 20%, particularly from about 3 to 12%, by weight of bound hydrophobe based on the weight of dry starch. Other illustrative film formers that may be used are modified starch, alginate, pectin, carboxymethylcellulose, polyvinyl alcohol, xanthan gum, rhamsan gum and welan gum. Typical modified starches include hydroxyalkylated starch with the alkyl group possessing 1 to 4 carbon atoms, oxidized, enzyme converted, thermally converted, acetylated and cationized starches. Particularly suitable film formers are hydrophobically modified starch, alginate, carboxymethylcellulose, polyvinyl alcohol and pectin. The particulate starch:film former blends may be used in amounts of from about 1:99 to 99:1 parts by weight of starch per part by weight of film former and more particularly from about 30:70 to 70:30 starch to film former.

EXAMPLES

The following examples further illustrate the embodiments of this invention. In the examples all parts and percentages are given by weight and all temperatures are in degrees Celsius unless otherwise noted. In the examples, and for the parameters as described throughout the specification and claims, particle size and particle volume fraction of the starches are determined using the following methods:

Procedure for Measurement of Volume Average Hydrated Starch Particle Size

A laser scattering particle size distribution analyzer, Horiba LA-900, is used to measure the volume average size of hydrated starch particles. Starches are prepared at 5% dry weight solids in de-ionized water, cooked at 90° C. for 20 minutes with minimal stirring using a magnetic stirrer. Starch solutions are added to the Horiba LA-900 in the wet mode using distilled water as the dispersant fluid. Additional starch or water is added so that the transmitted light is between 70 and 95%. The sample is vibrated in the ultrasonic chamber using ultrasound for 60 seconds to thoroughly disperse the sample prior to particle size measurement. A particle size distribution as well as the mean particle size is determined by the instrument on the basis of the volume. A refractive index value of 1.34 was used for all solutions, irrespective of the actual refractive index.

Procedure for Measurement of Hydrated Starch Particle Volume Fraction at 1% Solids.

The percent volume fraction occupied by the hydrated starch particles is measured using a blue dextran (Cybachron Blue labeled dextran, 2,000,000 average molecular weight supplied by Sigma) dye exclusion method. The blue labeled dextran is excluded from the hydrated starch particles. The dextran absorbance methods of Dengate, et al. (Starch 30 (1978) Nr.3, 80–84) and Evans, et al. (Journal of Texture Studies 10 (1979) 347–370) were modified as described below and used to measure the hydrated starch particle volume fraction.

Starch solutions are prepared at 5% solids by cooking at 90° C. for 20 minutes in a hot water bath. Twenty (20) grams of the starch solution at 2% solids is then mixed with an equal volume of 0.08% by weight blue dextran solution. The resulting 1% starch solids solution is centrifuged for 10 minutes at 10,000 rpm and the supernatant immediately decanted for spectroscopic analysis. The absorbance of the supernatant is scanned from 400–800 nm using a Perkin-Elmer UV-VIS spectrophotometer. Data is sampled at 620 nm. A baseline blank of deionized water is measured and subtracted from the sample scan. In addition, the 2% solids starch solution is mixed with an equal volume of de-ionized water (without the blue dextran polymer), centrifuged for 10 minutes at 10,000 rpm and the supernatant removed. The absorbance at 620 nm of this supernatant (representing scattering or absorbance of non-particulate soluble starch) is subtracted from the blue dextran sample scan. The concentration of blue dextran in the supernatant is then determined by comparing the absorbance at 620 nm to a calibration curve previously determined for a series of blue dextran solutions in deionized water of known concentration. The volume fraction of starch particles is then determined using the following equation:

% starch volume fraction at 1% solids=100−((0.04/percent concentration of blue dextran in supernatant)×100)

Example 1

This example illustrates the preparation of a converted or degraded, particulate and hydrophobically modified starch in accordance with this invention.

A starch slurry was prepared by suspending 3000 g, dry basis, of waxy maize starch in 4500 ml of water. The mixture was stirred at room temperature and the pH raised to 11.9 by adding 800 g of 3% aqueous NaOH solution. To this mixture 7.5 g of a 0.002% aqueous solution of potassium permanganate was added (i.e., 0.005% based on weight of starch which corresponds to 17.5 ppm of manganese ions based on weight of starch). Then 5.4 g of 30% $H_2O_2$ was added to the starch slurry over 3 minutes causing the pH of the slurry to drop (alkalinity titration of 25 ml aliquot gave 18.3 ml HCl (0.1N)). The reaction was held for 16 hours until no hydrogen peroxide remained, as indicated by a negative test on an $H_2O_2$ quant strip. The resulting starch was found to be degraded to a water fluidity (WF) of 38.

The temperature of the starch slurry was raised to 40° C. 80 ppm epichlorohydrin (0.24 g) was added to the starch slurry and reacted for 16 hours to crosslink the starch. The starch slurry was cooled down to room temperature (25° C.) and the pH was adjusted to 7.6 by neutralization with 10% $H_2SO_4$. Octenyl succinic acid anhydride (OSAA) (180 g) was slowly added to the starch slurry while maintaining a pH of about 7.5 to 7.8 by addition of 3% NaOH. The reaction was held for 6 hours while maintaining pH control between 7.5 and 7.8. After the reaction was complete, the pH was adjusted to 6.0 with diluted hydrochloric acid (3:1). The starch product was recovered by filtration, washed once with water and air dried. The percent reacted OSAA was determined by saponification of the ester group. Five grams of the starch product in 200 ml of water was cooked at a temperature of 100° C. for thirty minutes. The cooked starch solution was then cooled to room temperature where upon 50 ml of 0.1N sodium hydroxide was added. The solution was agitated for 48 hours. The excess alkali was then back-titrated with 0.1N HCl using phenolphthalein as an indicator. The results indicated that the starch ester contained 5% OSAA. The volume average particle size of a 5% by dry weight starch cook prepared at 90° C. for 20 minutes was 55 microns and the percentage volume fraction at 1% solids measured using the blue dextran method described herein was 14.3%.

Example 2

A waxy starch, converted to a 71 WF, was reacted with 6% octenyl succinic acid anhydride (OSAA) and crosslinked with 0, 300, 650 or 1000 ppm epichlorohydrin using the same procedure as Example 1. These samples were cooked at a total solids of 15%. This dispersion was heated by direct steam injection to 88 to 93° C. and held for 20 minutes within this temperature range. The final cooks were adjusted to three different solids between 10.8% and 5.6% (in order to vary the amount applied to the paper) and held in a constant temperature water bath at 66° C.

The surface sizing application was performed using a size press simulator composed of two heated, rubber-coated stainless steel rolls that were arranged in the format of a horizontal size press, where paper is fed vertically through the nip between the rolls.

A pond of the surface size starch (pre-heated to 66° C.) was recirculated between the rolls at a rate of 2 liters/minute in order to maintain a pond in the nip between the rolls. A 19 cm×25 cm sheet of an 80#/3000 ft$^2$ (130g/m$^2$) acid coated base stock (pre-weighed after equilibrating in a 22° C. /50% R.H. room) was attached with tape to a 1 meter long×20 cm wide plastic leader strip. With the size press simulator off, this leader strip was fed between the two rolls. While holding the end of the leader strip, the size press solution recirculation pump was then started and the motor driving the size press rolls was turned on. The leader was mechanically drawn through the nip between the rolls, carrying along with it the attached paper sheet. This sheet accelerated to a speed of 100 meters/minute by the time it reached the size press nip containing the recirculating surface size solution. The leader/sheet was collected after it exited the size press simulator and the now surface-sized sheet was removed from the leader and dried in a photographic-type drum drier.

The sheets were then re-conditioned in the 22° C./50% R.H. room and weighed again to determine the amount of surface-size starch (% pickup) that was applied to the sheet. These sheets were then tested for their air permeability (porosity) using a Hagerty Technologies Model 1 Air Permeability Tester (Hagerty Technologies, Inc., 34A Lyndon Road, Queensbury, N.Y. 12804). This unit develops porosity values equivalent to those obtained using a TAPPI Standard Method (T 460 om-88, "Air Resistance of Paper", TAPPI Press, Atlanta, Ga.). The porosity values in Table 1 are the times (average of four readings per sheet) required for 100 cm$^3$ of air to flow through a 6.4 cm$^2$ area of the sheet.

TABLE 1

| Additive | Seconds Porosity (% pickup) | Seconds Porosity (% pickup) | Seconds Porosity (% pickup) | Seconds Porosity (% pickup) | Seconds Porosity (% pickup) | Particle Size ($\mu$) | Volume fraction at 1% solids (%) |
|---|---|---|---|---|---|---|---|
| 71 WF waxy, 6% OSAA, 0 ppm epichlorohydrin | 196 (5.33) | 171 (4.89) | 145 (4.76) | 109 (4.32) | 87 (3.78) | 21 | 3.5 |
| 71 WF waxy, 6% OSAA, 300 ppm epichlorohydrin | 716 (7.29) | 306 (6.79) | 251 (4.44) | 171 (4.09) | 47 (2.00) | 55 | 8.3 |
| 71 WF waxy, 6% OSAA, 650 ppm epichlorohydrin | 1587 (6.18) | 1391 (6.03) | 646 (4.49) | 567 (4.07) | 510 (3.91) | 82 | 38.7 |
| 71 WF waxy, 6% OSAA, | 8119 | 8119 | 2364 | 2201 | 1035 | 73 | 37.8 |

TABLE 1-continued

| Additive | Seconds Porosity (% pickup) | Seconds Porosity (% pickup) | Seconds Porosity (% pickup) | Seconds Porosity (% pickup) | Seconds Porosity (% pickup) | Particle Size (μ) | Volume fraction at 1% solids (%) |
|---|---|---|---|---|---|---|---|
| 1000 ppm epichlorohydrin | (8.17) | (8.17) | (6.52) | (6.10) | (4.59) | | |

The performance (as measured by the increase in Hagerty readings) of the degraded, particulate and OSAA-reacted waxy starch was high over the range of epichlorohydrin crosslinking levels evaluated, and tended to increase with higher amounts of epichlorohydrin. As shown in table 1, with increasing amounts of epichlorohydrin, the hydrated volume average particle size and the percentage volume fraction at 1% solids both increased. All epichlorohydrin-crosslinked particulate starch compositions exhibited higher performance (reduced paper porosity) than the non-crosslinked 71 WF, 6% OSAA waxy starch base.

All compositions were able to reduce the porosity of paper to a greater degree than a hydroxyethylated corn starch (Grain Processing Corp. Coatmaster K580) which, when coated on paper at high pickups, was not able to produce porosity values above 24 seconds.

Example 3

A waxy starch, converted to a 38 WF, was reacted with 6% OSAA and 80 or 120 ppm epichlorohydrin (as per Example 1). As per Example 2, solutions of these starches were prepared, sheets were sized and porosity values and the percent pickup of starch on paper were measured. The results are given in Table 2.

TABLE 2

| Additive | Seconds Porosity (% pickup) | Seconds Porosity (% pickup) | Seconds Porosity (% pickup) | Seconds Porosity (% pickup) | Seconds Porosity (% pickup) | Particle Size (μ) | Volume fraction at 1% solids (%) |
|---|---|---|---|---|---|---|---|
| 38 WF waxy, 6% OSAA, 80 ppm epichlorohydrin | 951 (5.74) | 279 (5.44) | 224 (4.21) | 130 (3.37) | 97 (3.03) | 55 | 14.3 |
| 38 WF waxy, 6% OSAA, 120 ppm epichlorohydrin | 1958 (8.16) | 791 (5.90) | 699 (5.61) | 233 (4.25) | 240 (3.64) | 71 | 45.7 |

The degraded/crosslinked/OSAA-treated waxy starch significantly reduced the porosity of the paper. The performance was higher when the volume average hydrated particle size and the hydrated starch particle volume fraction were greater.

Example 4

A waxy starch, converted to a 60 WF, was reacted with 0, 3, 6 or 9% OSAA and 80 ppm epichlorohydrin (as per Example 1). As per Example 2, solutions of these starches were prepared, sheets were sized and porosity values, as well as the percent pickup of starch on paper were measured. The results are given in Table 3.

TABLE 3

| Additive | Seconds Porosity (% pickup) | Seconds Porosity (% pickup) | Seconds Porosity (% pickup) | Seconds Porosity (% pickup) | Seconds Porosity (% pickup) |
|---|---|---|---|---|---|
| 60 WF waxy, 0% OSAA, 80 ppm epichlorohydrin | 25 (7.98) | 31 (7.70) | 24 (4.38) | 24 (3.48) | 24 (1.67) |
| 60 WF waxy, 3% OSAA, 80 ppm epichlorohydrin | 224 (7.56) | 195 (5.75) | 144 (5.33) | 76 (4.24) | 47 (3.38) |
| 60 WF waxy, 6% OSAA, 80 ppm epichlorohydrin | 141 (6.21) | 220 (4.18) | 108 (2.54) | 216 (2.43) | 40 (1.73) |
| 60 WF waxy, 9% OSAA, 80 ppm epichlorohydrin | 338 (6.97) | 334 (6.09) | 138 (3.69) | 159 (3.45) | 67 (2.63) |

The performance (as measured by the increase in Hagerty readings) of degraded and particulate, crosslinked waxy starch increased significantly as the level of OSAA reacted onto the starch increased. The overall performance was highest at the 9% OSAA level.

Example 5

This is an example of a degraded, particulate starch blended at a 1:1 ratio with a film-former, in this case a fully dispersed 67 WF waxy reacted with 6% OSAA. A waxy starch, converted to a 40 WF, was reacted with 80 ppm epichlorohydrin (as per Example 1) to form the degraded, particulate starch after hydration by cooking through direct steam injection to 88 to 93° C. and holding for 20 minutes within this temperature range. For comparison, another waxy starch (converted to a 38 WF), was reacted with 80 ppm epichlorohydrin and 6% OSAA (as per Example 1). This was blended at a 1:1 ratio with an hydroxyethylated corn starch (Grain Processing Corp. Coatmaster K580). As per Example 2, solutions of these starches were prepared, sheets were sized and porosity values measured. Porosity values are given in Table 4.

TABLE 4

| Additive | Seconds Porosity (% pickup) | Seconds Porosity (% pickup) | Seconds Porosity (% pickup) | Seconds Porosity (% pickup) | Seconds Porosity (% pickup) |
|---|---|---|---|---|---|
| 1:1 67 WF waxy, 6% OSAA 40 WF waxy, 0% OSAA, 80 ppm epichlorohydrin | 1431 (6.08) | 1155 (5.63) | 255 (3.31) | 207 (3.16) | 87 (2.25) |
| 1:1 hydroxyethylated corn starch / 38 WF waxy, 6% OSAA, 80 ppm epichlorohydrin | 838 (5.00) | 654 (4.80) | 250 (3.20) | 215 (3.13) | 83 (2.0) |

The blend of the degraded, particulate starch and a degraded OSAA starch (the film former) was as effective at reducing paper porosity as the blend of a degraded, hydrophobic, particulate starch with a hydroxyethylated corn starch.

Example 6

A waxy starch, converted to a 38 WF, was reacted with 5% DDSA (dodecenyl succinic anhydride) or 6% Quat 342 (3-chloro-2-hydroxypropyl dodecyl ammonium chloride), and 80 ppm epichlorohydrin as per Example 1. Both starches were blended at a 1:1 ratio with a hydroxyethylated corn (Grain Processing Corp. Coatmaster K580). As per Example 2, solutions of these starches were prepared, sheets were sized and porosity values, as well as the percent pickup of starch on paper, were measured. The results are given in Table 5.

TABLE 5

| Additive | Seconds Porosity (% pickup) | Seconds Porosity (% pickup) | Seconds Porosity (% pickup) | Seconds Porosity (% pickup) | Seconds Porosity (% pickup) |
|---|---|---|---|---|---|
| 1:1 hydroxyethylated corn starch / 38 WF, 5% DDSA waxy base | 110 (6.25) | 52 (4.82) | 56 (4.46) | 42 (3.64) | 37 (2.79) |
| 1:1 hydroxyethylated corn starch / 38 WF, 6% Quat 342 waxy base | 571 (4.87) | 540 (4.56) | 59 (2.89) | 48 (2.70) | — |

The porosity reduction (as measured by the increase in Hagerty readings) provided by 1:1 blends of a hydroxyethylated corn starch (Grain Processing Corp. Coatmaster K580) with a degraded, particulate waxy starch substituted with either the DDSA or Quat 342 hydrophobes were significantly higher than hydroxyethylated corn starch alone, which, when coated on paper at high pickups, was not able to produce porosity values above 24 seconds.

Example 7

A waxy corn starch and a tapioca starch, converted to a WF of 46 and 48 respectively, were reacted with 6% OSAA and 80 ppm epichlorohydrin as per Example 1. Both starches were blended at a 1:1 ratio with a hydroxyethylated corn starch (Grain Processing Corp. Coatmaster K580). As per Example 2, solutions of these starches were prepared, sheets were sized and porosity values, as well as the percent pickup of starch on paper were measured. The results are given in Table 6.

TABLE 6

| Additive | Seconds Porosity (% pickup) | Seconds Porosity (% pickup) | Seconds Porosity (% pickup) | Seconds Porosity (% pickup) | Seconds Porosity (% pickup) |
|---|---|---|---|---|---|
| 1:1 hydroxyethylated corn starch / 46 WF, 6% OSAA, 80 ppm epichlorohydrin waxy corn base | 838 (5.00) | 654 (4.80) | 250 (3.20) | 215 (3.13) | 83 (2.0) |
| 1:1 hydroxyethylated corn starch / 48 WF, 6% OSAA, 80 ppm epichlorohydrin tapioca base | 654 (6.10) | 595 (5.94) | 132 (3.48) | 118 (3.47) | 76 (3.02) |

1:1 blends of hydroxyethylated corn starch with degraded, particulate, 6% OSAA starch, where the starch base was either waxy corn or tapioca, provided paper porosity reduction (as measured by the increase in Hagerty readings) which were significantly higher than the porosity reduction provided by hydroxyethylated corn starch alone.

Example 8

This example illustrates the ability of paper sized with the starch composition of this invention to resist the penetration of oil and grease. A waxy starch, converted to a 38 WF, was reacted with 6% OSAA and 80 ppm epichlorohydrin (as per Example 1). This starch was blended at a 2:1 ratio with an acetylated starch. As per Example 2, a solution of this starch blend was prepared, sheets were sized and the oil and grease resistance measured using "The 3M kit" (Tappi UM 557) as well as the percent pickup of starch on paper.

The results are given in the table below.

TABLE 7

| Additive | TAPPI UM557 Result (% pick-up) | TAPPI UM557 Result (% pick-up) | TAPPI UM557 Result (% pick-up) |
| --- | --- | --- | --- |
| 38 WF, 6% OSAA, 80 ppm epichlorohydrin starch, blended 2:1 with acetylated starch | 3 (3.87%) | 4 (4.37%) | 4 (4.63%) |

The degraded/crosslinked/OSAA treated waxy starch blended with the acetylated starch significantly improved the oil and grease resistance compared to the acetylated starch alone which has a 0 value of oil and grease resistance (TAPPI UM 557) over a pickup range of 1 to 5%.

Example 9

This example illustrates the ability of paper sized with the starch composition of this inventiion to provide improved surface strength as shown by the wax pick test. A waxy starch, converted to a 38 WF, was reacted with 6% OSAA and 80 ppm epichlorohydrin (as per Example 1). This starch was blended at a 1:1 ratio with an acetylated starch and compared to an acetylated starch to which 4% sodium alginate was added. These products were applied via an inclined size press to an alkaline paper grade at 200 m/min. The sized paper products were measured for wax pick which is an indication of surface strength using the TAPPI test method T-459. Results are shown in the following table.

TABLE 8

| Additive | Wax Pick |
| --- | --- |
| 38 WF, 6% OSAA, 80 ppm epichlorohydrin starch blended 1:1 with acetylated starch | 16 (2.78%) |
| Acetylated starch with 4% sodium alginate | 13 (2.88%) |

At equal application levels, the degraded/treated waxy starch blend significantly improved the surface strength compared to the blend of acetylated starch and sodium alginate as shown by the wax pick measurement made in accordance with TAPPI test method T-459.

Example 10

This example illustrates the ability of paper sized with the starch composition of this invention to resist the penetration of silicone oil (i.e. improve holdout). A waxy starch, converted to a 38 WF, was reacted with 6% OSAA and 80 ppm epichlorohydrin (as per Example 1). The starch was blended at two different ratios (35:65 and 65:35) with an acetylated starch and compared to a 10:1 blend of the acetylated starch and sodium alginate. Except for the acetylated starch/sodium alginate blend, all starches were prepared as per Example 2. The acetylated starch/sodium alginate blend was prepared by first dispersing sodium alginate in hot tap water and blending this with a 140° C. jet cook of the acetylated starch. A low porosity base stock was sized with these formulations using the procedure in Example 2. The surface sized sheets were measured for starch pickup and porosity as per Example 2 and the sheets were then coated with a 1.5 g/m silicone formulation (30 grams of Dow Corning's Syl-Off 7610 silicone plus 1.11 grams of Dow Corning's Syl-Off 7611 crosslinker) and cured for 1–2 minutes at 110–120° C. The sheets were then stained with Shirlastain A dye (a textile fiber identification dye from Lawson-Hemphill Sales, Inc. that stains fibers red and silicone yellow) by pouring 100 ml of dye over a 100 cm paper sample clamped in a 11.3 cm diameter Cobb ring (as per TAPPI T441) and pouring off the dye after a 1 minute contact time. The fiber-stained (red) area of the sheet was measured by scanning an image of the stained circle into a computer and using an image analysis software package (Sigma Scan Pro) to measure the red-stained area. The results are given in the table below.

TABLE 9

| Additive | Porosity (% Pickup) | Red-Stained Area |
| --- | --- | --- |
| 10:1 acetylated starch/ sodium alginate blend | 115700 (3.55%) | 10.8% |
| 38WF, 6% OSAA, 80 ppm epichlorohydrin starch blended 35:65 with acetylated starch | 128600 (3.54%) | 5.3% |
| 38WF, 6% OSAA, 80 ppm epichlorohydrin starch blended 65:35 with acetylated starch | 175000 (3.54%) | 3.7% |

The degraded/crosslinked/OSAA treated waxy starch blends significantly reduced the porosity of the paper compared to the acetylated starch/sodium alginate blend and also significantly reduced the red-stained area. This red-stained area is directly related to the areas of the sheet that were not sufficiently coated with the silicone fluid. A lower amount of red-stained area correlates with an improved holdout of silicone fluid. Such improved silicone coverage of the paper will improve its function as a release base.

What is claimed is:

1. A method of preparing paper comprising applying to the surface of a paper substrate a surface sizing effective amount of a composition comprising a blend of a) a degraded particulate starch having a water fluidity of 10 to 80, a volume average hydrated particle size of from about 20 to 300 microns and a volume fraction of hydrated particles of at least 5% at 1% solids; and b) a film forming material, wherein the weight ratio of a:b is from about 1:99 to 99:1.

2. The method of claim 1, wherein the weight ratio of a:b is from about 30:70 to 70:30.

3. The method of claim 1, wherein the film forming material is a starch hydrophobically modified with a hydrophobic hydrocarbon group of from 5 to 23 carbon atoms at about 1 to 20% substitution level by weight of bound hydrophobe based on the weight of starch.

4. The method of claim 1, wherein the film forming material is selected from the group consisting of a modified starch, alginate, pectin, carboxymethylcellulose, polyvinyl alcohol, xanthan gum, rhamsan gum and welan gum.

5. The method of claim 1, wherein the modified starch is selected from the group consisting of hydroxyalkylated starch with alkyl length of 1 to 4 carbons, oxidized starch, enzyme converted starch, thermally converted starch, acetylated and cationized starch.

6. The method of claim 1, wherein the surface sizing composition is used in an amount of from about 0.5 to 15% by weight based on the weight of the paper substrate.

7. A composition comprising a blend of a) a degraded particulate starch having a water fluidity of from about 10 to 80, a volume average hydrated particle size of from about 20 to 300 microns and a volume fraction of hydrated particles of at least about 5% at 1% solids; and b) a film forming material, wherein the weight ratio of a:b is from about 1:99 to 99:1.

8. The composition of claim 7 wherein the weight ratio of a:b is from about 30:70 to 70:30.

9. The composition of claim 7 wherein the film forming material is a starch hydrophobically modified with a hydrophobic hydrocarbon group of from 5 to 23 carbon atoms at about 1 to 20% substitution level by weight of bound hydrophobe based on the weight of the starch.

10. The composition of claim 7 wherein the film forming material is selected from the group consisting of a modified starch, alginate, pectin, carboxymethylcellulose, polyvinyl alcohol, xanthan gum, rhamsan gum and welan gum.

11. The composition of claim 10 wherein the modified starch is selected from the group consisting of hydroxyalkylated starch with alkyl length of 1 to 4 carbons, oxidized starch, enzyme converted starch, thermally converted starch, acetylated and cationized starch.

12. A paper comprising the composition of claim 7.

13. A paper comprising the composition of claim 9.

* * * * *